May 19, 1970 M. D. LISTON 3,512,889

SPECTROPHOTOMETER WITH PLURAL DISPERSION USING A SINGLE MONOCHROMATOR

Filed March 2, 1967 6 Sheets-Sheet 1

INVENTOR
MAX D. LISTON

BY Busser Smith & Harding

ATTORNEYS

INVENTOR
MAX D. LISTON
BY Busser, Smith & Harding
ATTORNEYS

May 19, 1970 M. D. LISTON 3,512,889

SPECTROPHOTOMETER WITH PLURAL DISPERSION USING A SINGLE MONOCHROMATOR

Filed March 2, 1967

6 Sheets-Sheet 3

INVENTOR
MAX D. LISTON

BY Busser Smith & Harding

ATTORNEYS

INVENTOR
MAX D. LISTON
BY Busser Smith & Harding
ATTORNEYS

INVENTOR
MAX D. LISTON
BY Bosse Smith & Hardy
ATTORNEYS

INVENTOR
MAX D. LISTON
BY Busser Smith & Harding
ATTORNEYS 3,512,889

SPECTROPHOTOMETER WITH PLURAL DISPERSION USING A SINGLE MONOCHROMATOR

Max D. Liston, La Habra, Calif., assignor to Smith Kline & French Laboratories, Philadelphia, Pa., a corporation of Pennsylvania Filed Mar. 2, 1967, Ser. No. 620,170
Int. Cl. G01j 3/42
U.S. Cl. 356—94 13 Claims

ABSTRACT OF THE DISCLOSURE

A rotating sector mirror alternately reflects a monochromatic light beam through sample and reference cells and the beam is reflected back through the monochromator to a photomultiplier.

Photoelectric switching means operates in synchronism with the rotating mirror to switch the output of an amplifier receiving the photomultiplier output alternately to measuring circuitry and to control circuitry for the photomultiplier power supply. The speed and duration of the operation of the photoelectric switching means are chosen so that the effects of alternating current in modulating the light beam and stray light are minimized.

The output signal from the photomultiplier is kept within a limited range by the use of a variable light beam attenuator associated with the reference cell and cooperating elements in the circuitry controlling the operating voltage of the photomultiplier.

BACKGROUND OF THE INVENTION

This invention relates to spectrophotometers and other instruments for measuring the absorption of light by various absorbing media at particular wavelengths. Instruments of this type have been used in the measurement of darkening of photographic film, but they have particular utility in the determination of the concentration of solutes in liquid solvents.

Spectrophotometers heretofore have had several aspects in common. Most have comprised a source of monochromatic light with means for varying the wavelength of the output beam, and the operation has involved the comparison of the absorbance of the beam by the sample to be measured and by a standard (usually water, pure solvent or air), the comparison being made from the output of a photosensitive device such as a phototube or photomultiplier.

The absorbance is expressed in terms of optical density (OD), which is related to the intensity of the light beam as it enters and leaves the sample as follows:

$$OD = \ln \frac{I_0}{I}$$

where $I_0$ is the intensity of the beam before it enters the sample and

I is the intensity of the light beam as it leaves the sample.

The reason for the adoption of the above relationship is that I is related to $I_0$ as an exponential function of the product of the concentration of the solute and the length of the light path through the absorbing medium. OD is therefore linearly related to solute concentration or sample width or the product of both.

In practice, $I_0$ may be taken to be the intensity of the light beam as it leaves a reference cell filled with pure solvent so that light absorbance by the walls of the sample cell does not affect the accuracy of the measurement.

The comparison between the absorbance of the sample and reference cells has been made by passing a monochromatic beam through the reference cell and "zeroing" the output meter, and thereafter substituting the sample cell for the reference cell. The result has been accomplished more expeditiously by mechanically alternating the passage of the beam, for example by the use of a vibrating mirror, through the sample and reference cells, and adjusting the sensitivity of the light intensity measuring apparatus electronically in accordance with the intensity of the light beam as it exits the reference cell.

Inaccuracies have been caused by stray light, and careful precautions have been necessary in the past to prevent the entrance of stray light into the sample or reference or into the photosensitive device. When the monochromators have involved the use of wedge filters and other filters of the film type, imperfections such as "pinholes" in the filter medium have allowed light at all of the source wavelengths to pass through the reference and sample, causing inaccuracies in measurement since the simple relationship between optical density and concentration and depth of the absorbing medium holds true only for monochromic light.

When the light source is activated by alternating current, the light beam is amplitude modulated at a frequency which is twice the alternating current frequency. This modulation of the light source and of the modulation of ambient light has resulted in inaccuracies in the output indications of instruments in which a beam is rapidly alternated between the reference and sample cells since the signal superimposed on the light beam as it passes through the sample cell is likely to be different from the signal superimposed on the light beam as it passes through the reference cell.

In instruments involving vibrating mirrors, accurate synchronization of the mirror vibration with the operation of the electronic circuitry is difficult to achieve, and various difficulties are caused by switching transients.

Where photomultipliers have been used, adjustments have been required for spontaneous changes in photomultiplier dark current.

Since the characteristics of photomultipliers vary considerably with the intensity of incident light, when they are used in spectrophotometry to measure the intensity of the light beam, it is difficult to obtain accurate reading for samples of both high and low optical density.

SUMMARY OF THE INVENTION

In accordance with the invention, the light beam is first passed through a monochromator, and is then alternately directed through the reference and sample cells. After the beam passes through either the reference or sample cell it is reflected back through the monochromator and is conducted to the photosensitive device. By passing the beam through the monochromator before and after passing it through the sample and reference cells, two advantages are achieved. First, light caused by fluorescence of the sample, either as a result of excitation by the monochromatic beam or by stray light, is prevented from entering the photosensitive device. Other effects of stray light are minimized, and it is possible to operate the apparatus in a normally lighted room without covering the sample and reference cells.

Second, if imperfections, such as "pin-holes," in the filter at the area on the filter through which the beam from the light source passes, light at all of the source wavelengths may pass through the refeernce and sample, but the beam returns through the filter at a different area, and the likelihood of inaccuracies resulting from these imperfections is greatly reduced.

By effecting chopping in the electrical circuitry by the use of a rotating opaque disc in conjunction with photodiodes, accurate commutation is achieved, and the wearing of mechanical parts, as is often the case with brush-type commutators, is avoided.

In addition, the chopping period, that is, the period during which the electrical circuitry responds to the reference or sample signal, is chosen so that the effects of line frequency amplitude modulation of the light beam and of line frequency modulation of stray light are avoided. The chopping period is selected so that it corresponds to exactly one cycle of the light amplitude modulation frequency, the result being that when the signal with the modulated signal superimposed is integrated, the net signal resulting from light modulation is approximately zero, and, at any rate, averages the same for each chopping period so that there is no substantial detrimental effect.

Spontaneous changes in photomultiplier dark current are compensated by a feedback loop in the electrical circuitry which establishes a reference level which, in effect, changes in response to changes in dark current.

By attenuating the light beam entering the reference cell holder incrementally, the signals received at the indicating meter are easily linearized since they remain within a small range of amplitudes. With the range changing circuitry used in conjunction with the light attenuator, fullscale variation in the meter indications is accomplished in several limited ranges of OD, and accurate readings can be obtained for samples having high and low optical densities. Because of the range changing circuitry and the provision for attenuating the light beam, the overall range of measurement of the apparatus is quite large.

Other objects will be apparent from the following description read in conjunction with the accompanying drawings in which:

DESCRIPTION OF THE PREFERRED EMBODIMENT

Figure 1:
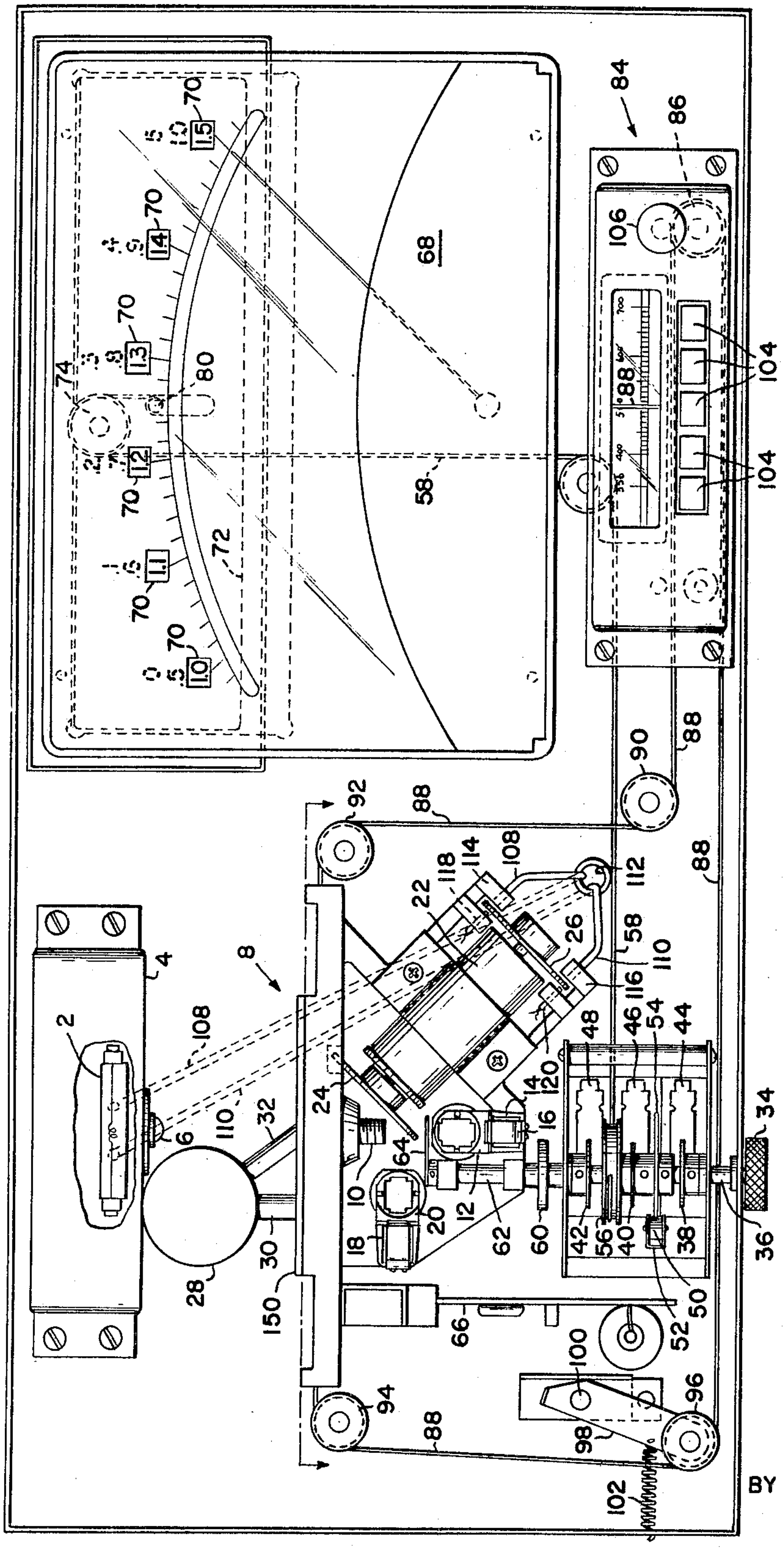
FIG. 1 is a plan view of the mechanical portion of the apparatus.
Figure 5:
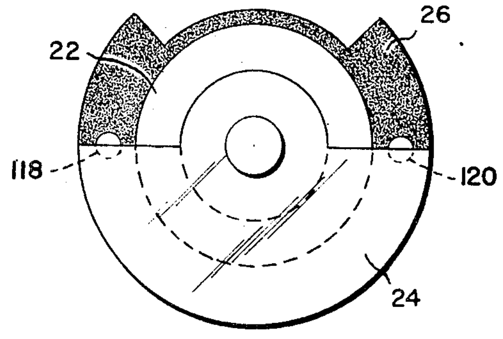
FIG. 5 is an elevation of a beam chopping sector mirror with its driving motor and an opaque light-chopping disc driven by the shaft of the motor.

Referring to FIG. 1, a light source is shown comprising a lamp 2 enclosed in a housing 4. A lens 6 is provided at an opening in the wall of housing 4 to pass a light beam through an optical assembly generally indicated at 8 and through a lens in a threaded lens holder 10 mounted in the housing of the optical assembly. A reference cuvette holder is indicated at 12, and a 90° prism 14 is held in place against curvette holder 12 by spring clip 16. Prism 18 is similarly mounted on sample curvette holder 20. A synchronous motor 22 is mounted so that the axis of its shaft is at an angle of 45° with respect to the direction of the light beam emerging from the lens in lens holder 10. At one end of the shaft of motor 22 there is mounted a sector mirror 24 comprising a 180° front-surfaced sector. At the opposite end of shaft of motor 22 there is mounted an opaque disc 26 from which is cut out a 90° segment. The relationship between mirror 24 and disc 26 is illustrated in FIG. 5.

Referring again to FIG. 1, a photomultiplier tube housing 28 is shown supported from the optical assembly housing 8 by a horizontal supporting post 30. The photomultiplier tube (not shown) is completely enclosed, and the only entrance for light into housing 28 is through a passage in the housing at the end of a covered quartz rod indicated at 32. As will become clear from FIGS. 8 and 9, the opposite end of quartz rod 32 communicates with a slit through which the light beam passes after it passes through the sample or reference cell.

The photosensitive device within housing 28 may be a multiplier photocell or a vacuum, solid-state or gas photocell or any other device which provides an electrical response to light.

Knob 34 operates a shaft 36 on which are mounted cams 38, 40 and 42. These cams operate microswitches respectively indicated at 44, 46 and 48. A roller 50 mounted on spring 52 cooperates with cam 54 in a conventional manner to impart a positive action to the rotating cam assembly. A pulley 56 is provided on shaft 36, and one end of cord 58 is attached to the periphery of pulley 56.

Figure 7:
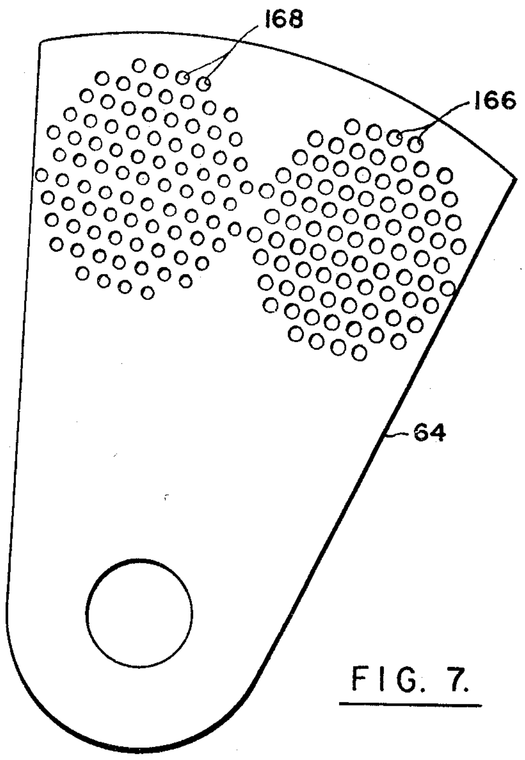
FIG. 7 is an elevation of a light attenuator used in the apparatus in conjunction with the reference cell for effecting range changes.

Shaft 36 connects through a coupling 60 to shaft 62, and at the end of shaft 62 there is mounted a light attenuator 64, the details of which will be apparent from FIG. 7.

The electrical circuitry of the apparatus is mounted on circuit board 66.

Figure 6:
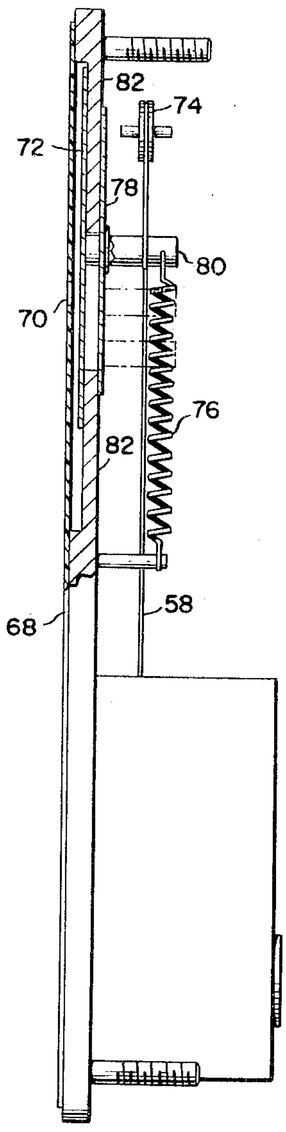
FIG. 6 is a side elevation, partly in section, of an indicating meter, showing, in the sectioned portion of the figure, a plate for carrying range indications and the means for effecting changes in the range indications.

An indicating meter 68 is illustrated in FIG. 1, and its face is provided with rectangular openings 70 through which numbers printed on plate 72 appear. It will be apparent that clockwise rotation of knob 34 causes cord 58, which passes over sheave 74, to raise plate 72, and that counterclockwise rotation of knob 34 permits 72 to be lowered under the action of spring 76 shown in FIG. 6. Referring particularly to FIG. 6, plate 72 and plate 78 are mounted on a pin 80, and these plates cooperate with the framework 82 of the meter to prevent lateral movement of plate 72. Cord 58 is tied to rod 80, and an end of spring 76 passes through a transverse hole in rod 80.

Again referring to FIG. 1, a wavelength selector generally indicated at 84 is provided with a pulley 86 about which passes a cord 88. Selector 84 is in all respects similar to a conventional automobile radio tuner except that an additional pulley 86 is arranged to be driven positively by a shaft rotating in correspondence with the position of dial indicator 88. The details of the means by which pulley 86 is driven are not shown since they will be readily apparent from an examination of a conventional automobile tuner. Cord 88 passes around sheave 90 and around sheave 92 and is connected at one end to the filter slide assembly (not shown in this figure). The other end of cord 88 is similarly connected to the opposite end of the filter slide assembly and passes around sheave 94 and around sheave 96 and is returned to pulley 86 in the wavelength selector assembly. Sheave 96 is mounted on a movable arm 98 pivoted at 100 and urged in a direction to maintain tension on the cord 88 by coil spring 102. The dial of wavelength selector 84 is desirably calibrated in terms of angstrom units or millimicrons. Pushbuttons 104 may be set to adjust the filter to preselected wavelengths, and continuous adjustment of the filter can be made by the operation of knob 106.

Each of a pair of light conducting fiber bundles 108 and 110 terminates adjacent lamp 2 to receive light. The fiber bundles extend underneath the chassis and emerge through hole 112. The ends of the fiber bundles are mounted in the clamping members 114 and 116 so that light from the end of fiber bundle 108 strikes photodiode 118, also mounted in a clamp, and light from fiber bundle 110 strikes photodiode 120. The fiber bundles and photodiodes are arranged so that light may be interrupted by rotating disc 26.

Figure 2:
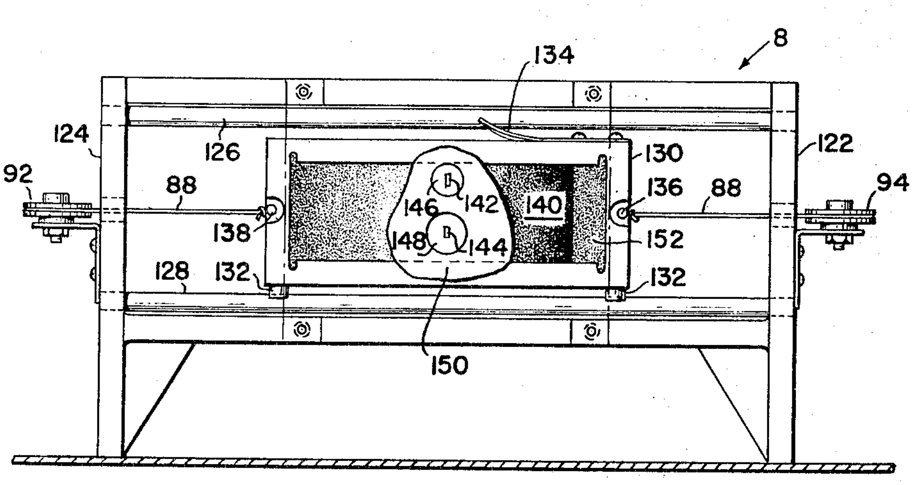
FIG. 2 is a partially cut-away elevation of the adjustable filter asembly showing collimating slits in the cut-away portion of the figure.

Referring to FIG. 2, filter assembly 8 is shown having a framework comprising vertical members 122 and 124 between which are mounted cylindrical bars 126 and 128. These cylindrical bars act as runners for a filter frame 130 which is provided on its lower edge with Teflon feet 132 and at its upper edge with a spring 134 which engages rod 126. Filter frame 130 is provided with pins 136 and 138 to which are tied ends of cord 88, which connects to the wavelength selector 84 shown in FIG. 1.

A wedge filter 140 is mounted in frame 130, and slits 142 and 144 are provided in recesses 146 and 148, respectively, in plate 150, which is fixed to the framework of assembly 8. Slit 142 is an entrance slit through which light passes from the light source to enter the filter, and slit 144 is an exit slit through which light passes as it leaves the filter after its second passage to enter the photomultiplier through quartz rod 32. The assembly including filter 140 and slit 142 constitutes a first monochromator, and filter 140 and slit 144 constitute a second monochromator. It will be apparent that separate filters could be used in association with the slits and that other arrangements for passing a light beam twice through a single means for selecting a wavelength or a small band of wavelengths may be employed.

Figure 12:
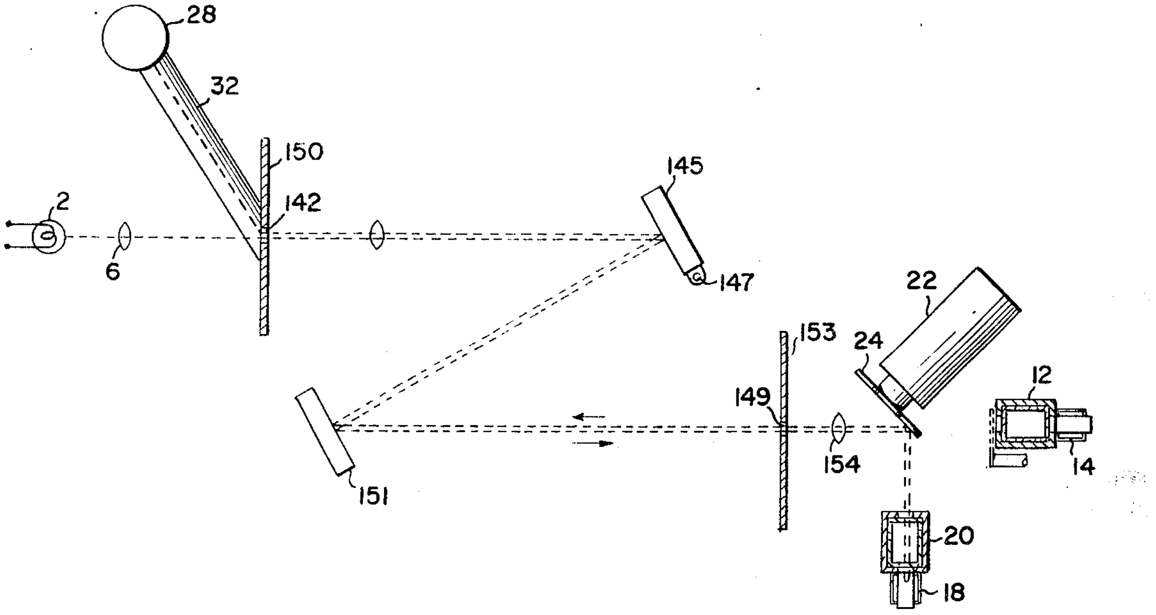
FIG. 12 is a diagrammatic plan view of a spectrophotometer having a grating-type double monochromator.

Such other means for selecting a wavelength or a small band of wavelengths may comprise a grating monochromator as shown in FIG. 12. A grating 145, of the reflection type, is pivoted at 147, so that the angular position of its face can be adjusted with respect to the direction of the light beam emerging from light source 2 through the slit 142. Grating 145 produces a dispersion, and slit 149 selects a small band of light wavelengths from the beam after it is reflected by mirror 151.

The beam is then alternately directed through the reference and sample cells by sector mirror 24, which is rotated by motor 22. The returning beam is passed through a lower slit (not shown) in baffle 153, and is again reflected by mirror 151 and dispersed by grating 145. A lower slit (not shown) in plate 150 selects a small band of wavelengths from the returning beam, and quartz rod 32 passes the selected band to the photomultiplier tube in housing 28.

It will be noted here that the monochromation of the entering beam is accomplished by slit 149, while the monochromation of the returning beam is accomplished by the lower slit in plate 150. Thus, the beam is monochromated twice, once before, and once after it passes through the reference or sample. Each monochromation selects the same band of wavelengths. By effecting monochromation twice, the effects of overlapping orders and ghosts which are produced by the grating are greatly reduced. The effects of stray light are minimized.

Figure 13:
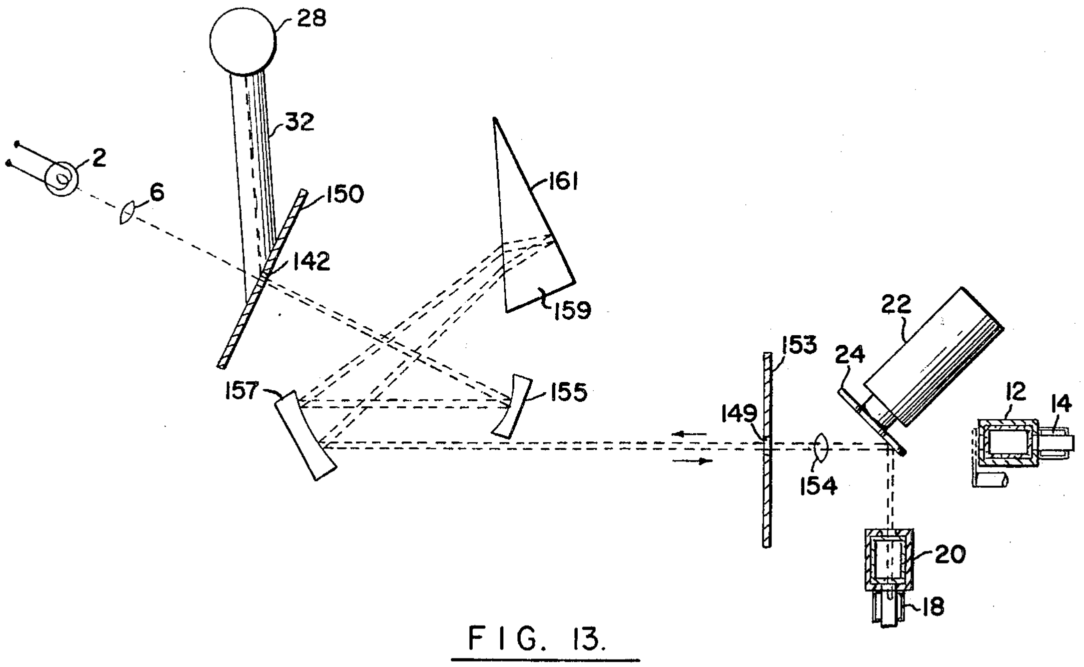
FIG. 13 is a diagrammatic plan view of a spectrophotometer having a prism-type double monochromator.

A prism monochromator, as shown in FIG. 13, may also be used. A concave mirror 155 reflects the entering light beam onto the surface of concave mirror 157 which, in turn, reflects the entering beam into a rotatable prism 159. Surface 161 of prism 159 is silvered to produce internal reflection. As the beam emerges from a prism 159, it is dispersed, and slit 149 in baffle 153 selects a small band of wavelengths, and the beam is alternately directed through the reference and sample cells by mirror 24. The returning beam emerges through a lower slit in baffle 153, and is reflected by mirror 157, through prism 159, and is reflected by mirror 155 through a slit (not shown) below slit 142 in plate 150. The beam is carried by quartz rod 32 to the photomultiplier.

Again, the first monochromation is effected by slit 149, and the second monochromation is effected by the lower slit in plate 150. The double monochromation is particularly effective in improving the inherently low resolution of prism-type monochromators. Again, the effects of stray light are greatly reduced.

The invention will be described with reference to the wedge filter monochromator, but, it will be understood that a prism or grating-type monochromator can be substituted for the wedge filter monochromator.

Reference should now be made to the wedge filter monochromator shown in FIG. 2.

Filter 140 is desirably such that a continuous adjustment of wavelengths can be accomplished by moving it past the slits 142 and 144. The filter must be such that the wavelength passed through slit 142 is the same as the wavelength passed through slit 144. The filter may be provided with one or more sections 152 which are fixed filters, and may be such as to extend into the infrared and ultraviolet ranges. "Light," as used in this specification and in the claims, is intended to refer to near ultraviolet and near infrared light as well as visible light.

Figure 3:
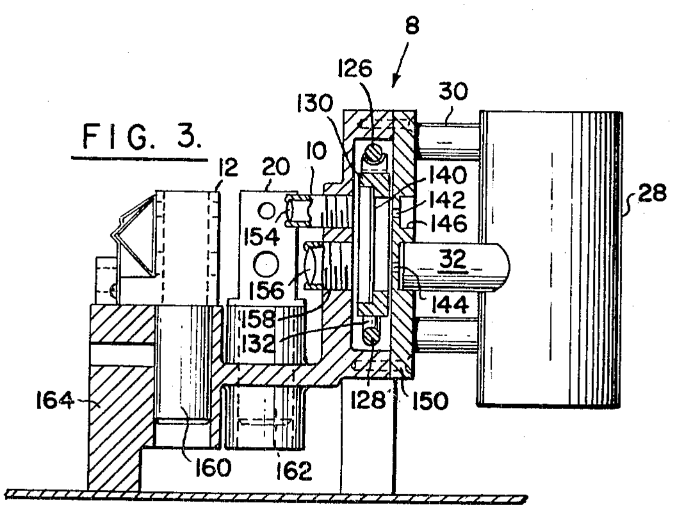
FIG. 3 is a vertical section of the filter and reference and sample holders, including an endless view of the filter slide assembly.

Other details of filter 140 and its relationship with slits 142 and 144 in the filter assembly will be apparent from FIG. 3 which shows, in addition, lenses 154 and 156 mounted, respectively, in threaded lens holders 10 and 158.

Cuvette holders 12 and 20 are provided with posts 160 and 162 by which they are removably mounted in framework 164. The cuvette holders are identical, and their details will be apparent from FIG. 8.

Figure 4A:
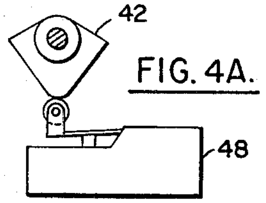
FIGS. 4A, 4B and 4C are elevations of switch operating cams on a common shaft and cooperating microswitches.
Figure 4B:
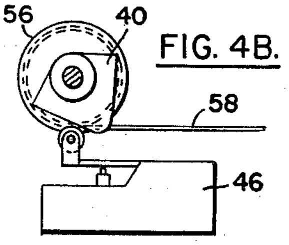
Figure 4C:
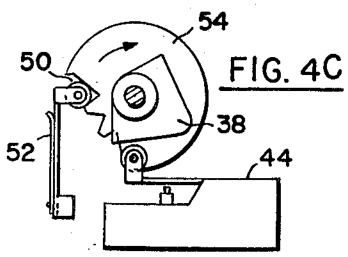

Referring to FIGS. 4A, 4B and 4C, the cam assembly is shown in its fully counterclockwise position. In this position, cam 42 closes switch 48, and switches 46 and 44 are open. As the control knob is rotated clockwise, switch 48 opens, and cam 40 closes switch 46. In the third position, switch 44 is closed, and switches 46 and 48 are opened.

Referring also to FIG. 1, it will be apparent that, when switch 44 is closed, the range indicated through rectangular openings 70 on the meter face is 1.0–1.5. When switch 46 is closed, the range .5–1.0 is indicated. When switch 48 is closed, the range 0–.5 is indicated.

Referring to FIG. 7, a light attenuator 64 is shown comprising an opaque, wedge-shaped plate having a first group of perforations 166, and a second group of perforations 168. Perforations 166 are larger than perforations 168, and a smaller cross-section of opaque material is presented to a light beam passing through perforations 166 than is presented to a light beam passing through perforations 168. Referring to FIG. 1, attenuator 64 is mounted on shaft 62, and is arranged so that perforations 166 or 168 may be selectively positioned in front of the hole in reference cuvette holder 12 through which light enters the reference cuvette, In a third position, neither of the groups of perforations is positioned in front of the entrance hole.

When knob 34 is in its extreme counterclockwise position, switch 48 is closed, and there is no obstruction to the light beam entering the reference cuvette. In this position, the OD range is 0–.5.

When knob 34 is in its intermediate position, switch 46 is rlosed, and perforations 166 on attenuator 64 are positioned to attenuate the light beam entering the reference cuvette, and the OD range is .5–1.0.

When knob 34 is in its extreme clockwise position, switch 44 is closed, and perforations 168 attenuate the light beam entering the reference cuvette. The OD range at this time is 1.0–1.5.

Figure 8:
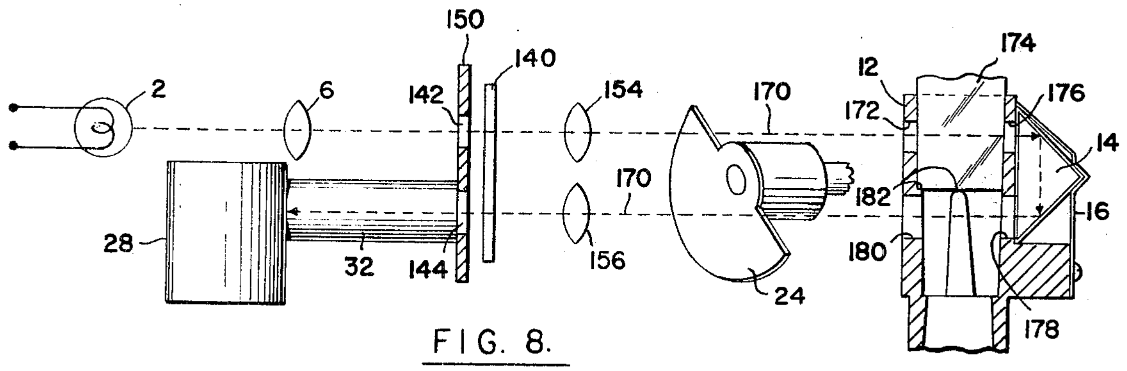
FIG. 8 is a diagrammatic elevation of the spectrophotometer showing the path of the light beam as it passes through the reference cell.

Referring to FIG. 8, sector mirror 24 is shown in a position such that the light beam 170 is allowed to enter the reference cuvette holder 12 through hole 172. The light beam passes through the reference cuvette 174, and through hole 176 in the cuvette holder and into prism 14 in which it is reflected downwardly and through holes 178 and 180 in the cuvette holder underneath cuvette 174. Cuvette 174 rests on ledges 182 molded into the cuvette holder.

It should be noted that, during part of its rotation, mirror 24 is in a position such that the light beam enters the reference cell but strikes the back of the mirror as it leaves the cell. When the mirror is in the position shown in FIG. 8, however, light beam 170 passes the mirror as it leaves hole 180, and passes through lens 156 and through filter 140 for the second time at a position directly below the position on filter 140 at which the beam passed through the filter for the first time. The beam passes through the slit 144 and through quartz rod 32 to the photomultiplier tube in housing 28.

Figure 9:
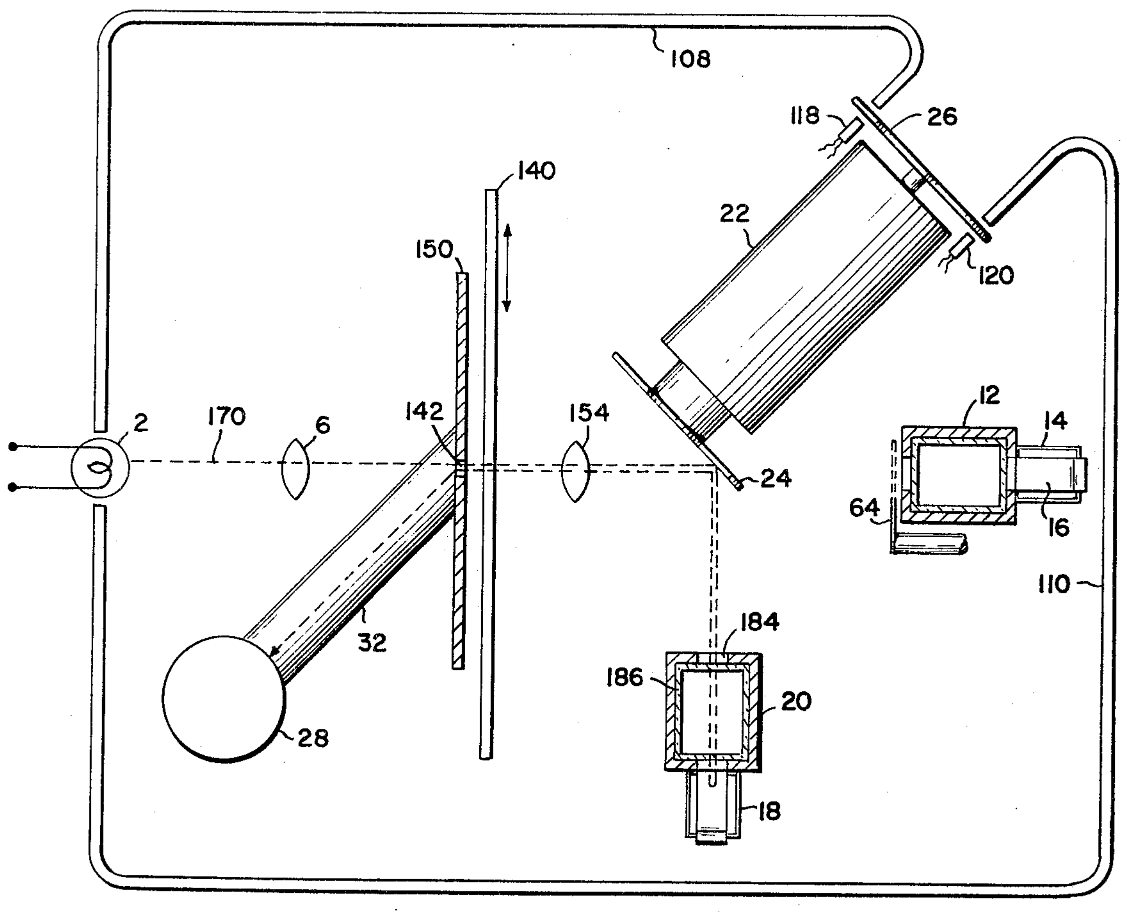
FIG. 9 is a diagrammatic plan view of the spectrophotometer showing the path of the light beam as it passes through the sample cell, and showing photodiodes operating in conjunction with the opaque disc for effecting chopping in the electrical circuitry.

In FIG. 9, mirror 24 is in a position such that light beam 170 is reflected at a right angle so that it enters hole 184 in the sample cuvette holder 20. The light beam is reflected by prism 18 and passes, as in the reference cell, underneath sample cuvette 186 and is again reflected at a right angle by mirror 24 so that it passes through lens 156 (not shown in this figure) through filter 140 through slit 144, and through quartz rod 32 to the photomultiplier. The entering and returning light paths are shown slightly displaced in this figure for the purpose of illustration. In the apparatus, the returning light path should be directly below the entering light path so that the beam enters and leaves the filter at points having the same filtering characteristics. It should be noted at this point, that, during part of its rotation, mirror 24 is in a position such that the light beam is reflected by the mirror into the sample cell, but the returning light beam passes underneath the mirror and is not returned through the filter.

The reference and sample cells are desirably positioned so that the path length for the beam between the source and the photomultiplier is the same whether the beam passes through the reference or sample cell, since otherwise the difference between the I and $I_0$ signals would be affected.

Figure 11:
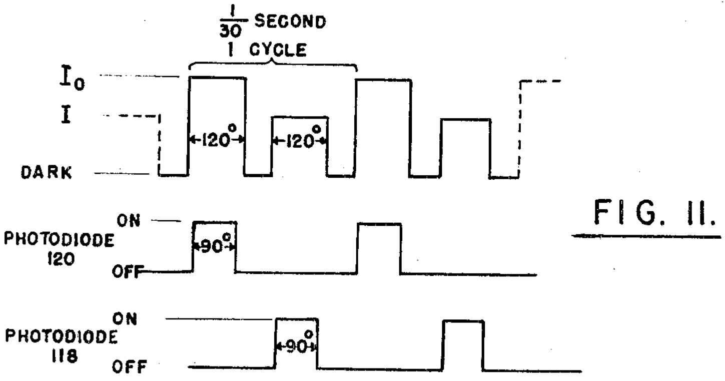
FIG. 11 is a diagram illustrating graphically the operation of the chopping circuitry.

Periods in the cycle of operation of the apparatus during which light is not received by the photomultiplier are accounted for by the fact, that while the mirror is in certain positions, the light beam returning from the sample cell passes the mirror or the light beam returning from the reference cell strikes the back of the mirror. These are "dark-current" intervals. The vertical distance between the entering and returning light beams is such that, during one rotation of the mirror, two dark-current intervals, each corresponding to 60° of rotation of the mirror, occur, and are separated by reference ($I_0$) and sample (I) intervals. Corresponding to 120° of rotation of the mirror. These intervals are indicated in the uppermost diagram of FIG. 11.

The relationship between sector mirror 24, disc 26 and photodiodes 118 and 120 is illustrated in FIG. 5, and it will be apparent that each of photodiodes 118 and 120 receives light from its corresponding fiber bundle during a 90° period of a single rotation of the shaft of motor 22. The arrangement is such that as seen from FIG. 11, the 90° interval during which photodiode 120 conducts is centered about the 120° $I_0$ period of the photomultiplier, and the 90° interval during which the photodiode 118 conducts is centered about the 120° I period of the photomultiplier.

The frequency of the line current operating the light source and the motor is 60 cycles per second. The shaft of motor 22 rotates at 1800 r.p.m., and a single rotation takes place in 1/30 second. The 90° interval during which each of photodiodes 118 and 120 is rendered conductive during each cycle is therefore 1/120 second. The length of each 90° is therefore the length of one cycle at 120 cycles per second; the frequency at which light from the line operated light source and line operated stray light is modulated.

Figure 10:
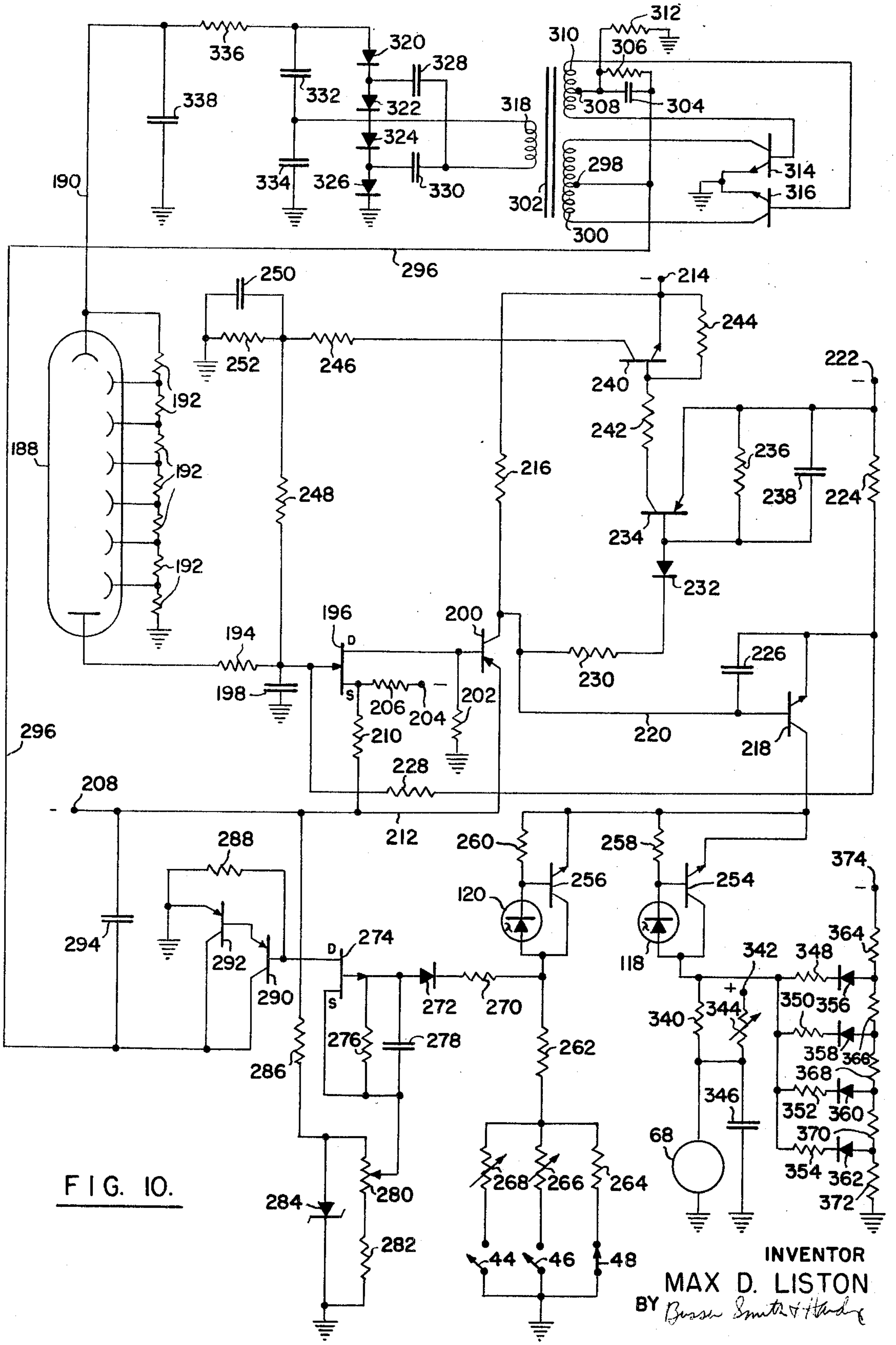
FIG. 10 is a schematic diagram of the electrical circircuitry operating in conjunction with the photomultiplier tube for providing output indications.

Referring to FIG. 10, a photomultiplier 188 has its cathode connected to a supply line 190 which also connects to the dynodes through a resistance string comprising resistors 192, the most remote of which connects to ground. The anode of photomultiplier 188 connects through resistor 194 to the gate of an N-channel field-effect transistor 196. The capacitor 198 connects the gate to ground. The drain of transistor 196 connects directly to the base of transistor 200, and is connected to ground through resistor 202. The source of transistor 196 is connected to a first negative supply terminal 204 through resistor 206, and to a second negative supply terminal 208 through resistor 210. The emitter of transistor 200 is connected to supply terminal 208 through line 212. The collector of transistor 200 is connected to supply terminal 214 through resistor 216 and is connected directly to the base of transistor 218 to line 220. The emitter of transistor 218 is connected to supply terminal 222 through resistor 224. Capacitor 226 connects its base and emitter.

A first feedback loop connects the emitter of transistor 218 to the gate of field-effect transistor 196 through resistor 228.

Resistor 230 and diode 232 connect the collector of transistor 200 to the base of transistor 234. The emitter of transistor 234 is connected directly to terminal 222, and resistor 236 and capacitor 238 are connected in parallel between the base and emitter of transistor 234. The base of transistor 240 is connected to the collector of transistor 234 through resistor 242, and the emitter of transistor 240 is connected directly to supply terminal 214. Resistor 244 connects the base and emitter of transistor 240. The collector of transistor 240 connects to the gate of field-effect transistor 196 through resistors 246 and 248, and the junction between resistors 246 and 248 is connected to ground through the parallel combination of capacitor 250 and resistor 252. It is thus seen that a second feedback loop exists between transistor 200 and field-effect transistor 196, and comprises transistors 234 and 240.

The collector of transistor 218 connects directly to the emitters of transistors 254 and 256. The bases of transistors 254 and 256 are connected to the collector of transistor 218 through resistors 258 and 260, respectively. Photodiode 118 is connected between the base and collector of transistor 254, and photodiode 120 is connected between the collector and base of transistor 256.

The collector of transistor 256 is connected through resistor 262 to a junction of resistors 264, 266, 268. Resistors 266 and 268 are variable. Microswitches 44, 46 and 48 are arranged to connect one of resistors 264, 266 and 268 to ground.

The collector of transistor 256 connects through resistor 270 and diode 272 to the gate of a P-channel field-effect transistor 274. The source of transistor 274 is connected to its gate through resistor 276 and capacitor 278, and is connected to the wiper of potentoimeter 280 which is connected in series with resistor 282 across Zener diode 284, the anode of which is connected to ground. The cathode of Zener diode 284 is connected through resistor 286 to line 212 which connects to supply terminal 208. The drain of field-effect transistor 274 is connected to ground through resistor 288, and is connected to drive a Darlington pair comprising transistors 290 and 292. The collectors of transistors 292 and 290 are connected together and through capacitor 294 to supply terminal 208. These collectors are connected through line 296 to center tap 298 of the primary winding 300 of transformer 302. Line 296 also connects through capacitor 304 and resistor 306 to the center tap 308 of winding 310 on transformer 302. Center tap 308 is connected to ground through resistor 312. The collectors of transistors 314 and 316 are respectively connected to opposite ends of winding 300, and their emitters are connected together and to ground. The bases of transistors 314 and 316 are respectively connected to opposite ends of windings 310.

The primary circuit of transformer 302 is a push-pull oscillator delivering an alternating current output to secondary winding 318 of transformer 302, the amplitude of which is dependent on the voltage in line 296. A bridge rectifier comprising diodes 320, 322, 324 and 326 and capacitors 328, 330, 332 and 334 delivers a high voltage direct current supply through the filter comprising resistor 336 and capacitor 338 to line 190 and to the cathode of photomultiplier 188.

The circuitry just described constitutes a third feedback loop, which is between the collector of transistor 256 and the cathode of the photomultiplier 188.

The collector of transistor 254 connects through resistor 340 to meter 68, which is desirably a microammeter. A bias supply at terminal 342 is connected to the input terminal of meter 68 through variable resistor 344. Meter 68 is shunted by capacitor 346.

The collector of transistor 254 is connected through diode 356, 358, 360 and 362 to junctions of resistors 364, 366, 368, 370 and 372 which constitute a voltage dropping network between supply terminal 374 and ground. The network comprising elements 348 through 372 is a linearizing network, and the values of the resistor elements are chosen so that as the voltage at the collector of transistor 254 increases, diodes 356 through 362 are progressively rendered conductive so that the resistance in parallel with resistor 340 progressively decreases. This circuitry functions to linearize the response of meter 68.

The overall operation of the apparatus is as follows.

A light wavelength is selected by operating either knob 106 or one of buttons 104 shown in FIG. 1 to position filter 140 (FIG. 2) so that monochromatic light of the desired wavelength passes from the light source, through slit 142, and through the filter and lens 154.

The operating range may be selected according to a visual observation of the density of the sample to be measured by rotating knob 34 (FIG. 1). If the sample is very opaque, for example, the OD range 1.0 to 1.5 may be selected. If, subsequently the meter reading is found to be too low, the range .5–1.0 can be selected. Knob 34 functions both to change the scale indications on the meter and to close one of switches 44, 46 and 48.

Referring again to FIG. 1, the sample cuvette is inserted in cuvette holder 10, and the reference cuvette, if used, is inserted in holder 12.

When motor 22 is energized, the light beam emerging from the filter is alternately passed through the sample and reference cuvettes as discussed previously with reference to FIGS. 8, 9 and 11.

Referring to FIG. 10, as light strikes the cathode of photomultiplier 188, its anode current varies according to the intensity of the light. As the gate of transistor 196 is driven in a negative direction when light having passed through either the sample or reference cell strikes the photomultiplier, the drain of transistor 196 goes negative, and transistor 200 becomes more conductive, as does transistor 218, so that the collector of transistor 218 becomes more negative. If the negative-going pulse at the collector of transistor 218 results from a pulse of light passing through the reference cuvette holder, the light striking photodiode 120 15° later in the operating cycle causes transistor 256 to become conductive so that a negative pulse passes through diode 272 to charge capacitor 278. The supply voltage passing through line 296 to the oscillator comprising transistors 314 and 316 is the supply voltage for the operation of the photomultiplier and varies inversely with the amplitude of the $I_0$ pulse at the collector of transistor 256. If, for any reason, the voltage pulse at the collector of transistor 256 decreases, the supply voltage to the oscillator increases, and the supply voltage to the photomultiplier is accordingly increased. In this way, the circuit compensates for the normal changes in light source output and in photomultiplier response which occur with age and also compensates for line voltage variations. An initial adjustment of the voltage applied to the cathode of the photomultiplier is made by potentiometer 280 which supplies a reference voltage to the source of field-effect transistor 274.

Since light attenuator 64 operates in conjunction with switches 44, 46 and 48, the amplitude of the output of the amplifying circuitry can be made to stay within a relatively small range. For example, in the 0–.5 OD range, when the light attenuator does not obstruct the beam entering the reference cell, switch 48 is closed, and resistor 264, being a relatively low resistance, causes the signal passed through diode 272 to be relatively low in amplitude so that the supply voltage to the photomultiplier is correspondingly low. In the higher OD ranges, the light beam is attenuated as it enters the reference cell, but since the voltage dropping circuit permits a signal of higher amplitude to pass through diode 272, the sensitivity of the photomultiplier is increased and the output of the amplifying circuitry, delivered through transistor 254 to the linearizing circuitry and to the indicating meter, remains within a limited range. Since the range is limited, effective linearization can be accomplished by a simple network having a small number of components.

During a 90° interval centered about the 120° interval during which light passes through the sample cell, photodiode 118 is rendered conductive for $\frac{1}{120}$ second. At this time, the I pulse appears at the collector of transistor 254, and its amplitude is registered on microammeter 68. Because the amplitude of this I pulse does not vary linearly with OD, the linearizing network comprising elements 348 through 374 makes the necessary corrections as explained previously. A small number of elements is sufficient to constitute the linearizing network, since the range of current measurable by microammeter 68 is made small with the aid of the range-changing circuitry and the light attenuator.

Capacitor 346 prevents the needle of meter 68 from bouncing, and meter 68 can be calibrated by adjustment of variable resistor 344.

The amplifier comprising transistors 196 and 200 is provided with a feedback loop including diode 232, transistor 234 and transistor 240. The feedback loop acts to maintain the collector of transistor 200 at a constant voltage level to maintain a constant dark current level. It should be noted here that the voltage applied to terminal 214 is more negative than that applied to terminal 222 so that diode 232 is conductive when transistor 200 is relatively non-conductive. Terminal 208 is positive with respect to both terminal 214 and 222.

If the collector of transistor 200 tends to become more negative than the potential at terminal 222, transistor 234 becomes more conductive driving the base of transistor 240 more positive so that transistor 240 drives the gate of transistor 196 negative. This causes the base of transistor 200 to become more negative so that its collector is driven positive and returns to the reference level so that diode 232 becomes non-conductive. This feedback loop thus establishes a maximum negative excursion of the collector of transistor 200 so that the dark current level is maintained constant as a reference, and the amplitudes of the I and $I_0$ pulses are measured with respect to this reference level.

When the collector of transistor 200 tends to become positive with respect to the reference level, which it does when $I_0$ and I pulses appear at the gate of transistor 196, there is no effect through the feedback loop comprising transistors 234 and 240 since diode 232 does not conduct. The emitter of transistor 218, however, becomes positive when I and $I_0$ appear so that a positive pulse is passed through the feedback loop comprising resistor 228 to the gate of transistor 196. The feedback loop including resistor 228 provides negative feedback for self-compensation of the amplifying circuitry including transistors 196, 200 and 218.

The 120 c.p.s. modulation of the light beam and of ambient light may superimpose an alternating signal on the I and $I_0$ pulses which will be amplified and delivered to the emitters of transistors 254 and 256. Transistors 254 and 256 are each rendered conductive for exactly one cycle of this 120 cycle signal, and therefore the average values of each of the superimposed signals passed to the measuring and photomultiplier supply control circuits is approximately zero. The times during which each of transistors 254 and 256 is rendered conductive during one cycle of operation may, of course, be the period of one cycle at 120 c.p.s. or another integral multiple of the period of one cycle at 120 c.p.s. with the same result that the effect of the 120 cycle modulation of the light beam is eliminated. Capacitor 346 in the measuring circuit prevents microammeter 68 from responding to the attenuating superimposed signal, and capacitor 294 prevents the supply voltage of the photomultiplier from being responsive to the alternating signal.

The effects of various transients which may occur in the amplifying circuitry at the beginning and end of I and $I_0$ pulses are eliminated by the selection, by the switching circuitry, of intermediate portions of these pulses.

Meter 68 can be replaced by other ouput means, for example, a chart recorder responsive both to the collector current of transistor 254 and to the position of filter 140 so that a continuous curve of OD vs. wavelength can be traced.

I claim:

1. A spectrophotometer comprising means operated by alternating current to produce a beam of light, means alternately directing said beam through a reference path and a sample cell, photoelectric detecting means receiving said beam and providing an output varying in accordance with the intensity of said beam, switching means receiving the output of said detecting means, controllable means for adjusting the sensitivity of said detecting means, and output means, said switching means connecting the output of said detecting means to control said controllable means during the time during which said beam passes through said reference path and connecting the output of said detecting means to said output means during the time during which said beam passes through said sample cell, a monochromator and means directing said beam through said monochromator before it reaches said photoelectric detecting means, wherein the improvement comprises means controlling said switching means in response to the condition of said means alternately directing said beam, to cause said switching means to connect the output of said detecting means to said controllable means and to said output means for alternating intervals equal in duration to an integral multiple of the period of one-half of one cycle of said alternating current, said intervals being separate from each other.

2. A spectrophotometer according to claim 1 in which said detecting means includes a photomultiplier and means amplifying the output of said photomultiplier and in which said controllable means for adjusting the sensitivity of said detecting means includes an oscillator, amplifying means connected to the output of said detecting means when said switching means connects the output of said detecting means to control said controllable means and providing operating current for said oscillator, and means converting the output of said oscillator to an operating voltage for said photomultiplier and connecting said operating voltage to said photomultiplier.

3. A spectrophotometer comprising a source of light, a monochromator receiving light from said source and producing a beam of substantially monchromatic light, means alternately directing said beam thrugh a reference path and a sample cell, photoelectric detecting means receiving said beam and providing n output vrying ccord-h ceiving said beam and providing an output varying in accordance with the intensity of said beam, switching means receiving the output of said detecting means, controllable means for adjusting the sensitivity of said detecting means, and output means, said switching means being responsive to the condition of said means alternately directing said beam through said reference path and said sample cell to connect the output of said detecting means to control said controllable means during the time during which said beam passes through said reference path and to connect the output of said detecting means to said output means during the time during which said beam passes through said sample cell wherein the improvement comprises a light attenuator, means for selectively positioning said light attenuator in the path of said beam between said means alternately directing said beam and said reference path and means included in said controllable means for increasing the sensitivity of said detecting means when said beam is attenuated by said light attenuator.

4. A spectrophotometer comprising means producing a beam of light, means alternately directing said beam through a reference path and a sample cell, photoelectric detecting means receiving said beam and providing an output varying in accordance with the intensity of said beam, switching means receiving the output of said detecting means, controllable means for adjusting the sensitivity of said detecting means and output means, said switching means being responsive to the condition of said means alternately directing said beam through said reference path and said sample cell to connect the output of said detecting means to control said controllable means during the time during which said beam passes through said reference path and to connect the output of said detecting means to said output means during the time during which said beam passes through said simple cell, a monochromator and means directing said beam through said monochromator before it reaches said photoelectric detecting means, wherein said detecting means includes a photocell, amplifying means receiving the output of said photocell, a feedback loop including an amplifier delivering an output to the input of said amplifying means and receiving, at its input, an output of said amplifying means, and means preventing said amplifier in said feedback loop from receiving an input when said beam strikes said photocell.

5. A spectrophotometer comprising means producing a beam of light, means alternately directing said beam through a reference path and a sample cell, photoelectric detecting means for receiving said beam of light and providing an output varying in accordance with the intensity of said beam when it is received by said photoelectric detecting means, switching means receiving the output of said detecting means, controllable means for adjusting the sensitivity of said detecting means, and output means, said switching means being responsive to the condition of said means alternately directing said beam through said reference path and said sample cell to connect the output of said detecting means to control said controllable means during the time during which said beam passes through said reference path and to connect the output of said detecting means to said output means during the time during which said beam passes through said sample cell wherein the improvement comprises a monochromator arranged to receive and monochromate said beam from said means producing said beam of light both before and after said beam passes through said reference path and said sample cell, said monochromator comprising means for dividing light into component frequencies separated in space and means defining first and second slits, each for selecting a narrow band of said component frequencies, said first and second slits being fixed with respect to each other and said means for dividing light being movable with respect to said slits, said means producing a beam of light directing said beam along a first path through said monochromator for selection of a narrow band by the first of said slits, reflecting means for reflecting the monochromated beam of light, after it passes through said reference path or said sample cell, through said monochromator along a path parallel to said first path but in a direction opposite the direction of the beam in said first path for selection of a narrow band by the second of said slits, said photoelectric detecting means receiving said beam after it passes through said monochromator means a second time.

6. A spectrophotometer comprising means producing a beam of light, means alternately directing said beam through a reference path and a sample cell, photoelectric detecting means for receiving said beam of light and providing an output varying in accordance with the intensity of said beam when it is received by said photoelectric detecting means, switching means receiving the output of said detecting means, controllable means for adjusting the sensitivity of said detecting means, and output means, said switching means being responsive to the condition of said means alternately directing said beam through said reference path and said sample cell to connect the output of said detecting means to control said controllable means during the time during which said beam passes through said reference path and to connect the output of said detecting means to said output means during the time during which said beam passes through said sample cell wherein the improvement comprises a monochromator receiving and monochromating said beam from said means producing a beam of light, said monochromator comprising a wedge filter, means defining first and second slits, said slits being in fixed relation to each other and being positioned with respect to said wedge filter so that each slit opens to an area of said wedge filter having substantially the same transmission characteristics as the area to which the other slit opens, and said wedge filter being movable relative to said slits, said means producing a beam of light directing said beam along a first path through the first of said slits and said wedge filter for selection of a narrow band of light frequencies and then through said reference path or said sample cell, reflecting means for reflecting the monochromated beam of light, after it passes through said reference path or said sample cell, through said wedge filter in the opposite direction and through the second of said slits, said photoelectric detecting means receiving said beam after is passes through said monochromator means a second time.

7. A spectrophotometer comprising means producing a beam of light, means alternately directing said beam through a reference path and a sample cell, photoelectric detecting means for receiving said beam of light and providing an output varying in accordance with the intensity of said beam when it is received by said photoelectric detecting means, switching means receiving the output of said detecting means, controllable means for adjusting the sensitivity of said detecting means, and output means, said switching means being responsive to the condition of said means alternately directing said beam through said reference path and said sample cell to connect the output of said detecting means to control said controllable means during the time during which said beam passes through said reference path and to connect the output of said detecting means to said output means during the time during which said beam passes through said sample cell wherein the improvement comprises a monochromator receiving and monochromating said beam from said means producing a beam of light both before and after said beam passes through said reference path or said sample cell, said monochromator comprising a diffraction grating and means defining first and second slits, said slits being in fixed relation to each other and said grating being moveable relative to said slits to vary the angle at which a beam of light strikes the grating and the angle between the grating and a diffracted beam which passes through one of said slits, said means producing a beam of light directing said beam along a first path to the grating, said grating dividing said beam into component frequencies separated in space and the first of said slits being arranged to select a narrow band of said frequencies, means for reflecting the monochromated beam of light, after it passes through said reference path or said sample cell, to said grating along a second path parallel to the path of the beam from said grating to the first slit, the second of said slits being arranged to select a narrow beam emerging from said grating along a third path parallel to said first path, said photoelectric detecting means receiving said beam after it passes through said monochromator a second time.

8. A spectrophotometer comprising means producing a beam of light, means alternately directing said beam through a reference path and a sample cell, photoelectric detecting means for receiving said beam of light and providing an output varying in accordance with the intensity of said beam when it is received by said photoelectric detecting means, switching means receiving the output of said detecting means, controllable means for adjusting the sensitivity of said detecting means, and output means, said switching means being responsive to the condition of said means alternately directing said beam through said reference path and said sample cell to connect the output of said detecting means to control said controllable means during the time during which said beam passes through said reference path and to connect the output of said detecting means to said output means during the time during which said beam passes through said sample cell wherein the improvement comprises a monochromator receiving and monochromating said beam from said means producing a beam of light both before and after said beam passes through said reference path or said sample cell, said monochromator comprising a prism and means defining first and second slits, said slits being in fixed relationship to each other and said prism being moveable relative to said slits to vary the angle at which a beam of light strikes the prism and the angle between the prism face and a dispersed beam which passes through one of said slits, said means producing a beam of light directing said beam along a first path to the prism, said prism dispersing said beam into component frequencies separated in space and the first of said slits being arranged to select a narrow band of said frequencies, means for reflecting the monochromated beam of light, after it passes through said reference path or said sample cell to said prism along a second path parallel to the path of the beam from said prism to the first slit, the second of said slits being arranged to select a narrow beam emerging from said prism along a third path parallel to said first path, said photoelectric detecting means receiving said beam after it passes through said monochromator a second time.

9. A spectrophotometer comprising means producing a beam of light, means alternately directing said beam through a reference path and sample cell, photoelectric detecting means for receiving said beam of light and providing an output varying in accordance with the intensity of said beam when it is received by said photoelectric detecting means, switching means receiving the output of said detecting means, controllable means for adjusting the sensitivity of said detecting means, and output means, said switching means being responsive to the condition of said means alternately directing said beam through said reference path and said sample cell to connect the output of said detecting means to control said controllable means during the time during which said beam passes through said reference path and to connect the output of said detecting means to said output means during the time during which said beam passes through said sample cell, monochromator means receiving and monochromating said beam from said means producing said beam of light and means directing said monochromated beam, after it passes through said reference path or said sample cell through said monochromator means a second time, said photoelectric detecting means receiving said beam after it passes through said reference path or said sample cell and said monochromator means, said means alternately directing said beam through a reference path and a sample cell including a motor, and a mirror mounted on a shaft of said motor, and said switching means including means producing light, a pair of photosensitive means, a pair of electronic switching means, each controlled by one of said photosensitive means, and opaque means driven by said motor for alternately permitting and denying illumination, by said means producing light, of each of said photosensitive means to cause switching of said electronic switching means, the intervals during which said electronic switching means are rendered conductive being separated by intervals during which said opaque means permits neither of said electronic switching means to be rendered conductive.

10. A spectrophotometer according to claim 9 in which said means producing a beam of light is supplied with alternating current and in which said opaque means permits said electronic switching means to be rendered conductive for the period of an integral multiple of one-half of one cycle of said alternating current.

11. A spectrophotometer comprising means producing a beam of light, means directing said beam alternately through a reference path and a sample cell, photoelectric detecting means, means directing said beam, after it passes through said reference path and said sample cell to said photoelectric detecting means, means varying the response of said photoelectric detecting means in accordance with the intensity of said beam after it passes through said reference path, means providing an output responsive to the output of said photoelectric detecting means and a monochromator receiving and monochromating said beam from said means producing said beam of light both before and after said beam passes through said reference path or said sample cell, said monochromator comprising means for dividing light into component frequencies separated in space, and means defining first and second slits, each for selecting a narrow band of said component frequencies, said first and second slits being fixed with respect to each other and said means for dividing light being movable with respect to said slits, said means producing a beam of light directing said beam along a first path through said monochromator for selection of a narrow band by the first of said slits, reflecting means for reflecting the monochromated beam of light, after it passes through said reference path or said sample cell, through said monochromator along a path parallel to said first path but in a direction opposite the direction of the beam in said first path for selection of a narrow band by the second of said slits, said photoelectric detecting means receiving said beam after it passes through said monochromator means a second time.

12. A spectrophotometer comprising means for producing a beam of light, photoelectric detecting means, monochromator means receiving and monochromating said beam, a reference path, a sample cell, and moving mirror means dividing the monocromated beam into a reference beam and a sample beam alternating in time, said reference beam passing along said reference path and said sample beam passing through said sample cell, wherein the improvement comprises reflecting means located in the paths of said reference beam and said sample beam after they pass through said reference path and said sample cell respectively, said reflecting means being so arranged as to reflect said reference beam and said sample beam through said monochromator means in the opposite direction and along paths parallel to the path of said beam ol light through said monochromating means, said photoelectric detecting means being arranged to receive said reference and sample beams after they pass through said monochromator means in said opposite direction.

13. A spectrophotometer according to claim 12 in which said reflecting means is also arranged to reflect said reference beam through said reference path a second time before it reenters said monochromator means and to reflect said sample beam through said sample cell a second time before it reenters said monochromator means.

References Cited

UNITED STATES PATENTS 3,247,758 4/1966 Turner -------------- 356—96

OTHER REFERENCES

"Highly Sensitive Recording Microspectrophotometer" Chance et al. Review of Scientific Instruments vol. 30 #8 August 1959, pp. 735–741.

"Chemical Instrumentation" H. A. Strobel, Addison-Wesley Publishing Company, Inc., Reading, Mass. Copyright 1960, pp. 208–215.

RONALD L. WILBERT, Primary Examiner

V. P. McGRAW, Assistant Examiner

U.S. Cl. X.R.

250—226; 356—180